(12) United States Patent
Günther et al.

(10) Patent No.: US 10,766,177 B2
(45) Date of Patent: Sep. 8, 2020

(54) GUIDE BUSHING FOR AN INJECTION MOULDING APPARATUS

(71) Applicant: GÜNTHER Heisskanaltechnik GmbH, Frankenberg (DE)

(72) Inventors: Herbert Günther, Allendorf (DE); Siegrid Sommer, Burgwald (DE); Torsten Schnell, Lichtenfels (DE)

(73) Assignee: GÜNTHER Heisskanaltechnik GmbH, Frankenberg (DE)

( * ) Notice: Subject to any disclaimer, the term of this patent is extended or adjusted under 35 U.S.C. 154(b) by 281 days.

(21) Appl. No.: 15/484,851

(22) Filed: Apr. 11, 2017

(65) Prior Publication Data

US 2017/0291337 A1 Oct. 12, 2017

(30) Foreign Application Priority Data

Apr. 12, 2016 (DE) .......................... 10 2016 106 745

(51) Int. Cl.
*B29C 45/28* (2006.01)
*B29C 45/03* (2006.01)
*B29C 45/27* (2006.01)

(52) U.S. Cl.
CPC .......... *B29C 45/2806* (2013.01); *B29C 45/03* (2013.01); *B29C 2045/2761* (2013.01); *B29C 2045/2889* (2013.01)

(58) Field of Classification Search
CPC ................ B29C 45/2806; B29C 45/03; B29C 2045/2889; B29C 2045/2761
See application file for complete search history.

(56) References Cited

U.S. PATENT DOCUMENTS

| | | | |
|---|---|---|---|
| 4,923,387 A | 5/1990 | Gellert | |
| 2003/0091684 A1 | 5/2003 | Hefner | |
| 2009/0110762 A1* | 4/2009 | Baumann | B29C 45/2737 425/143 |

FOREIGN PATENT DOCUMENTS

| | | |
|---|---|---|
| DE | 3249486 C3 | 6/1984 |
| DE | 3403603 A1 | 8/1985 |

(Continued)

OTHER PUBLICATIONS

Machine translation of Gunther (DE 20 2006 017 380 U1) obtained from Espacenet.com Aug. 15, 2019 (Year: 2019).*

(Continued)

*Primary Examiner* — Michael M. Robinson
(74) *Attorney, Agent, or Firm* — Conley Rose, P.C.; Keith C. Rawlins

(57) ABSTRACT

Disclosed is a guide bushing for the guiding and sealing of a closing needle of a needle valve nozzle of an injection moulding apparatus, the guide bushing having a main part and a fastening element, wherein the main part has a through-opening for the closing needle, wherein the through-opening comprises at least one guiding portion, which encloses the closing needle with slight movement play, wherein the through-opening comprises at least two expansion portions, whose diameter in each case is larger than that of the at least one guiding portion. The guide bushing moreover comprises a fastening element, which is securable to the main part, wherein a seal element is arranged between the fastening element and the main part, bearing against the entire circumference of a closing needle inserted into the through-opening.

14 Claims, 1 Drawing Sheet

(56) References Cited

FOREIGN PATENT DOCUMENTS

| DE | 3926357 A1 | 8/1990 |
|---|---|---|
| DE | 20118609 U1 | 2/2002 |
| DE | 202006017380 U1 | 3/2008 |
| DE | 102016106745.8 | 4/2016 |
| EP | 1223020 B1 | 7/2002 |
| EP | 3231574 A1 | 10/2017 |

OTHER PUBLICATIONS

Foreign Communication from the priority application- Office Action of German Patent Application No. 10 2016 106 745.8, in German language, dated Nov. 8, 2016, 10 pages.

Foreign communication from a related counterpart application—Office Action of Chinese Patent Application No. 201710227785.X, dated Mar. 4, 2020, with translation, 16 pages.

* cited by examiner

GUIDE BUSHING FOR AN INJECTION MOULDING APPARATUS

CROSS-REFERENCE TO RELATED APPLICATIONS

This application claims priority to German Patent Application No. 10 2016 106 745.8 filed Apr. 12, 2016, entitled "Guide Bushing for an Injection Moulding Apparatus," which is incorporated by reference herein in its entirety.

FIELD OF INVENTION

The invention concerns a guide bushing, as well as an injection moulding apparatus with such a guide bushing.

BACKGROUND

Injection moulding apparatuses often comprise needle valve nozzles, with which a flowable mass at a predeterminable temperature and under high pressure is supplied to a removable mould insert. The needle valve nozzles have pneumatically, hydraulically or electrically operated closing needles, which periodically open and close the gate openings in the mould insert. This enables the most precise possible material dispensing, especially with a rapid shot sequence. However, the flowable mass can also be injected in segmented manner, e.g., during cascade moulding, by a definitely controlled opening and closing of the injection point.

Each closing needle is mounted so as to move axially in the die region of the injection moulding apparatus and it is preferably led centrally through a flow channel for the moulding mass in the nozzle region (for this, see for example DE 3 249 486 C3 or DE 3 403 603 A1). The flow channel usually terminates in a nozzle mouthpiece, forming a nozzle exit opening at the end face. In the closing direction, the lower end of the closing needle engages in a seal seat fashioned in the nozzle mouthpiece or in the mould insert.

For the tight guidance of the closing needle, a guide bushing or sealing sleeve is customarily inserted in the distributor plate of the injection moulding apparatus, which receives the cylindrical shaft of the closing needle (for this, see for example DE 39 26 357 A1 or EP 1 223 020 B1). Between the closing needle and the guide bushing there remains a free space in the form of a hollow cylinder, into which flowable material enters during the operation of the injection moulding apparatus, so that the needle is sealed off against the flow channel. At the same time, a lubricating effect is produced, which decreases the friction between the closing needle and the bushing.

Moreover, it is known from DE 20 2006 017 380 U1 how to provide at least one guiding portion in a guide bushing for the closing needle of a needle valve nozzle, which encloses the closing needle with slight movement play, as well as at least two expansion portions, whose diameter is larger than that of the at least one guiding portion. The expansion portions serve as receiving spaces for the flowable material in the through-opening. By using a plurality of such expansion portions, on the one hand a lubricating function for the closing needle can be assured by the flowable material collected in the receiving spaces, while at the same time the cumulative sealing effect of the expansion portions filled with flowable material is improved.

Despite optimal design of such a sealing system, on account of the relative high pressures within the die and on account of the travel movements of the needle, as well as the low-viscosity materials used, it cannot be prevented that the moulding mass will penetrate through the guiding and sealing bushing to the outside. Material losses are the result. Furthermore, the material residues foul both the closing needle and the die, which not only affects the sealing action, but also may over time hinder the opening and closing movement of the closing needle. Costly cleaning or servicing work is unavoidable.

SUMMARY OF INVENTION

The goal of the invention is to avoid these and other drawbacks of the prior art and to further improve the guiding and sealing of closing needles in an injection moulding apparatus. In particular, a sealing arrangement is desirable that is economical to build with simple means and easy to manipulate.

The main features of the invention are indicated in the independent claims. Additional features are the subject matter of the dependent claims.

In a first aspect, a guide bushing for the guiding and sealing of a closing needle of a needle valve nozzle of an injection moulding apparatus is disclosed. The guide bushing comprises a main part with a through-opening for the closing needle, wherein the through-opening comprises at least one guiding portion, which encloses the closing needle with slight movement play. The through-opening moreover comprises at least two expansion portions, whose diameter in each case is larger than that of the at least one guiding portion.

The guide bushing moreover comprises a fastening element, which is securable to the main part, wherein a seal element is arranged between the fastening element and the main part, bearing against the entire circumference of a closing needle inserted into the through-opening.

The closing needle is preferably enclosed by the guiding portions with the least possible movement play, so that the play of the closing needle preferably amounts to only a few µm. The expansion portions for example have a diameter which is 0.5 mm to 3 mm, especially 1 mm to 2.5 mm, larger than the diameter of the guiding portions.

The guiding portion(s) ensure a good and constantly secure guiding of the closing needle within the guide bushing. The expansion portions on the other hand can specifically hold flowable material, which decreases the frictional forces within the guide bushing. The closing needle guided to slide therein is thus constantly lubricated enough. Thanks to the additional seal element, which is secured by means of a fastening element in the guide bushing, it can be assured that a possibly inadequate sealing action of the flowable material collected in the expansion portions is compensated, so that no flowable material escapes from the guide bushing into the region above the guide bushing. Thus, costly cleaning or servicing work is eliminated.

According to one embodiment, the fastening element is configured as a hollow cylinder for at least a portion and it has an external thread on an outer envelope surface. With corresponding design of a seat for the guide bushing in an injection moulding apparatus, the fastening element can thus be secured in simple manner in the injection moulding apparatus, such as in a distributor plate, by screwing it into the seat. For the securing of the guide bushing in such a seat, the fastening element can be mounted on the main part, for example, and then be screwed into the seat. In this way, the fastening element can secure the guide bushing in simple manner in a seat of an injection moulding layout. The fabrication of such a thread is easy to accomplish, so that no major production costs arise in the fabrication of the guide bushing.

According to another embodiment, the fastening element comprises an encircling flange rim, wherein the flange rim is designed to apply a force to the seal element in the direction of the main part when securing the fastening element to the main part and screwing the fastening element into a corresponding seat. By narrowing the space into which the seal element can expand, the seal element can thus be pressed in the direction of the closing needle at the same time. With corresponding deformability of the seal element, the bearing surface of the seal element at the closing needle can thus be enlarged and the sealing action of the seal element improved.

According to another embodiment, the seal element preferably consists of an elastomer. For example, the seal element can consist of vulcanizates of natural or silicone rubber, polyethylene (PE), or polytetrafluoroethylene (PTFE).

According to another embodiment, the seal element is annular. For example, a conventional O-ring can be used as the seal element. However, one prerequisite for this is that the inner diameter of the O-ring used does not differ significantly from the diameter of the closing needle. Otherwise, the sealing action of the seal element might be inadequate on account of an interrupted contact surface with the closing needle. For example, an elastomer sealing ring such as Kalrez 7075 can be used, which is distinguished by high thermal stability and thus can withstand the high temperatures prevailing in an injection moulding layout.

According to another embodiment, the fastening element comprises on an outer envelope surface an external thread. By the use of a removal tool which can be screwed onto the external thread, a removal of the main part of the guide bushing from an injection moulding layout can be simplified.

According to another embodiment, the guiding portions each comprise a cylindrical inner circumference, which is oriented coaxially to the closing needle. Further, the expansion portions according to another embodiment can each have the shape of an annular or hollow cylindrical recess, so that the closing needle is always evenly surrounded by the flowable material in the region of the expansion portions.

According to another embodiment, the expansion portions are arranged at regular intervals from each other along a longitudinal axis of the main part, which has further favourable effect on the sealing action.

Preferably, the main part and/or the fastening element are configured as a single part, which improves the stability of the main part and/or the fastening element.

In a further aspect, disclosed is an injection moulding apparatus with a distributor plate, in which at least one flow channel for a flowable material is formed, with at least one needle valve nozzle, through which the flowable material is able to be supplied as a continuation of the flow channel to a removable mould insert, with at least one closing needle, which passes through the flow channel in lengthwise displacement for at least a portion and which can be brought by a drive unit into an opening and a closing position, wherein the injection moulding apparatus comprises a guide bushing with the above specified features.

One embodiment of the invention provides for one guiding portion of the guide bushing to lie at least for a portion in the flow channel. This produces a region of the guide bushing constantly in direct contact with the flowable material, which exerts pressure on the guide bushing during each injection process. This means that the contact region is pressed in a sealing manner against the closing needle upon overcoming the slight movement play, so that no more material can get through the guide bushing from the injection moulding apparatus to the outside during the high-pressure phase.

Advantageously, the guiding portion has or forms at least one contact surface for the flowable material, likewise lying at least for a portion in the flow channel. The material to be moulded can therefore act directly on the contact surface and activate the guide bushing in this region like a check valve. The contact surface is preferably formed by the outer circumference of the guiding portion, wherein the outer circumference is a slanting surface, such as a conical surface.

Special benefits emerge when the guiding portion and/or the contact surface are exposed to the flowable material all around them. In this way, the material can act uniformly on the guide bushing and on the contact surface, so that the region protruding into the flow region is pressed evenly along the entire circumference of the closing needle. The needle is sealed all around and centred in its middle position.

It is also helpful when the region comprises a cylindrical inner circumference, which is oriented coaxially to the closing needle. This inner circumference therefore forms not only a sealing surface between the needle and the guide bushing, but also a centring element for the needle.

In terms of design, it is advantageous for the guiding portion to protrude by the contact surface radially or axially into the flow channel. This simplifies not only the design of the guide bushing, but also its assembly, which has an altogether favourable effect on the manufacturing and assembly costs.

One advantageous modification provides for the region protruding into the flow channel to form an end region of the guide bushing, wherein the contact surface is formed by the outer circumference of the region.

The guide bushing is advantageously a separately exchangeable component. Thus, being an expendable element, the guide bushing when necessary can be individually replaced at all times quickly and conveniently, without other components also having to be replaced at the same time, such as the closing needle, the overall nozzle, the distributor plate or a component press-fitted inside it.

The guide bushing is advisedly securable on and/or in the distributor plate, wherein the securing is preferably releasable. For this, it sits in a recess in the distributor plate and/or in the needle valve nozzle, in which it can be secured with suitable means.

The guide bushing can at least partly project outward from the distributor plate, so that a heat exchange is possible between the guide bushing and the surroundings, such as for the purpose of accomplishing or assisting a cooling of the guide bushing.

According to one embodiment, a guiding portion of the guide bushing lies at least for a portion in the flow channel here.

BRIEF DESCRIPTION OF THE DRAWINGS

Further features, details and benefits of the invention will emerge from the wording of the claims as well as from the following description of exemplary embodiments with the aid of the drawings. There is shown:

DETAILED DESCRIPTION

Figure 1:
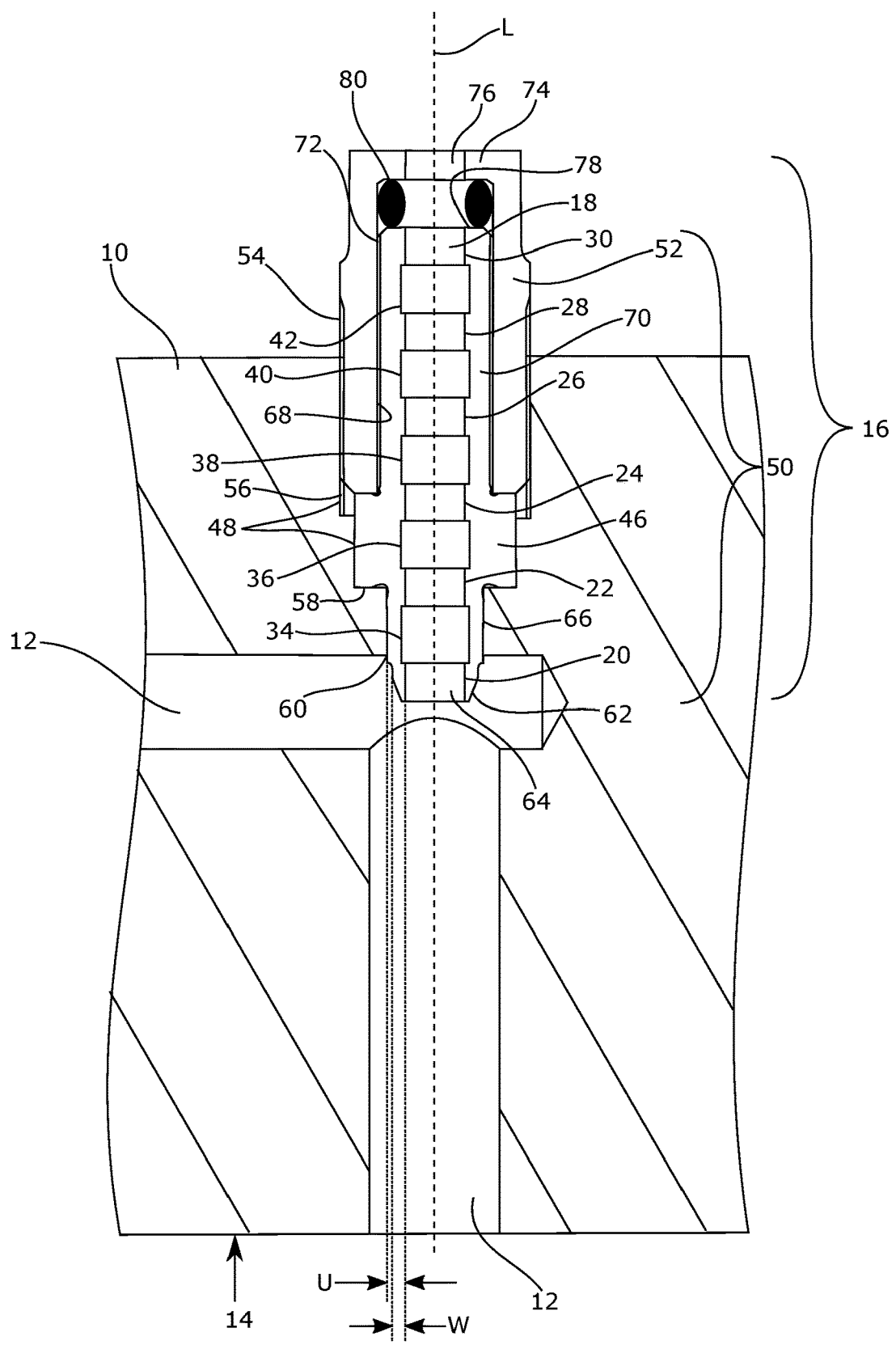
FIG. 1 a schematic cross-sectional view of one embodiment of a guide bushing.

The arrangement shown in FIG. 1 in cross section is part of an injection moulding apparatus serving for the manufacture of moulded parts from a flowable mass, such as a plastic melt. The injection moulding apparatus comprises a distributor plate 10, in which a system of flow channels 12 is formed. The flow channel 12 represented in FIG. 1 extends horizontally for a portion and empties vertically into a needle valve nozzle (not shown), which is mounted at the bottom side 14 of the distributor plate 10.

Each needle valve nozzle has a preferably outside-heated nozzle body (likewise not shown), in which a material tube concentric to the longitudinal axis L is formed as a continuation of the flow channel 12 extending perpendicularly. The latter terminates in a nozzle mouthpiece, forming a nozzle exit opening at the end face, by which the moulding material is supplied through a gate opening to a separable mould insert (likewise not shown).

For the opening and closing of the gate opening preferably formed in the mould insert, the injection moulding apparatus has a closing needle (not shown), which is able to move lengthwise in the flow channel in the material tube of the needle valve nozzle as well as in the vertically extending section (in FIG. 1) of the flow channel 12 in the distributor plate 10 and which is bringable by a mechanical, electrical, pneumatic or hydraulic drive unit (not shown) into a closing and opening position. In the closing position, the closing needle engages by a closing part formed at the end face in the gate opening through the nozzle exit opening in sealing manner.

In the die region, the closing needle is connected through the distributor plate 10 and through a clamping plate (not shown) to the drive unit, which periodically moves the needle up and down.

For the guiding and sealing of the closing needle, a guide bushing 16 is installed in the distributor plate 10. This has a central through-borehole 18 in a main part 50, whose inner diameter in guiding portions 20, 22, 24, 26, 28 and 30 of the guide bushing 16 corresponds to the outer diameter of the closing needle except for a slight movement play, preferably in the micrometer range, and which extends through the guide bushing 16 in the designed operational state of the injection moulding apparatus. The closing needle thus has a constantly precise and central guidance within the main part 50.

Between the individual guiding portions 20, 22, 24, 26, 28, 30, preferably located at regular intervals from each other along the longitudinal axis L, there are formed axial expansion portions 34, 36, 38, 40, and 42, whose respective inner diameter is slightly larger than the outer diameter of the closing needle. The depth of the individual expansion portions 34, 36, 38, 40, 42 in the radial direction of the through-borehole 18 lies for example in the range of 0.5 mm to 3 mm, or between 1.5 mm and 2.5 mm.

The expansion portions 34, 36, 38, 40, 42 formed in the main part 50 of the guide bushing 16 receive flowable material from the flow channel 12 during the operation of the injection moulding apparatus, which results in the sealing off of the closing needle against the flow channel 12 and the die surroundings. This sealing action is further intensified in that a diminishing pressure gradient is present from the lowermost expansion portion 34 to the uppermost expansion portion 42. At the same time, the flowable mass within the expansion portions 34, 36, 38, 40, and 42 acts as a lubricant, so that the friction between the closing needle and the main part of the guide bushing 16 is decreased. During the operation, the mass present in the expansion portions 34, 36, 38, 40 and 42 does not take part in the up and down movement of the closing needle, so that no pumping action is generated.

The main part 50 of the guide bushing 16 has a widened flange 46, which sits centrally in a corresponding recess 48 in the distributor plate 10. Above the flange 46, the main part 50 has a neck portion 70 smaller in outer diameter, which is enclosed coaxially by a fastening element 52, being configured in the embodiment shown as a screw bushing. The fastening element 52 has a hollow cylindrical basic shape.

The fastening element 52 moreover has an encircling flange rim 74 at its top side. The flange rim in turn has a central opening 76, which is oriented concentrically with the through-borehole 18 of the main part 50. The diameter of the opening 76 corresponds preferably to the diameter of the guiding portions 20, 22, 24, 26, 28 and 30, so that the opening 76 of the fastening element 52 assists in the guidance of a valve needle in the guide bushing 16. Between the flange rim 74 and a top side 78 of the main part 50 there is arranged an annular seal element 80 in the embodiment shown. The seal element 80 can be for example a sealing ring made of an elastomer. Advantageously, an elastomer should be chosen which can withstand the high temperatures usually prevailing in injection moulding apparatuses, without the elastomer becoming brittle or melting.

The fastening element 52 moreover has an external thread 54, which can engage with a corresponding internal thread 56 of the recess 48. For the fastening of the guide bushing 16 in the distributor plate 10, first of all the guide bushing 16 is inserted into the recess 48 of the distributor plate 10, so that the guide bushing 16 rests by its flange 46 against the bottom 58 of the recess 48. Then the seal element 80 is arranged on the top side 78 of the main part 50 of the guide bushing 16. Alternatively, the seal element 80 can also be arranged in the fastening element 52. The fastening element 52 is then screwed into the recess 48 and thus into the distributor plate 10. In this process, the fastening element 52 slides by its inner wall 68 along an outer circumference of the neck portion 70, until the fastening element 52 encounters by its lower rim the flange 46 of the main part 50. By further screwing of the fastening element 52 into the recess 48, the fastening element 52 exerts a force on the flange 46 in the direction of the bottom 58 of the recess 48. The bottom 58 of the recess 48 and the (not otherwise designated) bottom side of the flange 46 then lie with form-fitting one against the other so that the guide bushing 16 is fixed not only in the distributor plate 10, but also at the same time is sealed off by a surface perpendicular to the longitudinal axis L.

When the fastening element 52 is screwed into the recess 48, the flange rim 74 after a certain depth of insertion exerts a force in the axial direction on the seal element 80 and presses it against the top side 78 of the main part 50. Thanks to the elastic properties of the seal element 80, the seal element 80 stretches in the radial direction in this process. If a closing needle is in this case located in the through-borehole 18, the seal element 80 is pressed against the closing needle. On account of the elasticity of the seal element 80, this increases the bearing surface of the seal element 80 against the surface of the closing needle, so that an additional efficient sealing is produced. It can be ascertained by the difference between the length of the fastening element 52 and the length of the neck portion 70 how much the seal element 80 is compressed when the fastening element 52 is screwed in.

Below the flange 46, the main part 50 has (in the direction of the needle valve nozzle) a further neck portion 60, whose outer diameter is likewise smaller than the outer diameter of the flange 46. The wall thickness W of the guiding portion 20 formed at the lower end of the neck portion 60 is preferably smaller than the wall thickness U of the neck portion 60. Furthermore, the outer circumference 62 forms a slanting surface, preferably a conical surface, in the region of the guiding portion 20 at the level of the inner circumference 64, so that the wall thickness W further diminishes toward the needle valve nozzle.

In order to accommodate the neck portion 60 in the distributor plate 10, a through-borehole 66 is produced between the recess 48 and the flow channel 12, whose inner diameter substantially corresponds to the outer diameter of the portion 60. This reaches as far as the flow channel 12, while the guiding portion 20 protrudes into the flow channel 12 by its circumference 64, enclosing the closing needle, and its conical surface radially and concentrically to the longitudinal axis L. The guiding portion 20 for the closing needle thus lies entirely in the mass flow, while the slanted or conical surface forms a contact surface for the material which—just like the closing needle—is bathed by the moulding material on all sides in the flow channel 12.

The mode of functioning of the guiding and sealing guide bushing 16 is based substantially on the elastically deformable wall of the guiding portion 20 which lies in the flow channel 12. If the closing needle is opened, this slides at first unhindered within the guide bushing 16 from the closing position to the opening position, while the guiding portions 20, 22, 24, 26, 28 and 30 slide with slight movement play along the outer circumference of the needle. Once this has reached its end or opening position, the injection pressure is built up, i.e., the melt being moulded is pressed with high pressure through the flow channel 12 into the mould cavity. In this process, the flowable mass flows around the closing needle and the inclined outer circumference 62 of the guiding portion 20 evenly on all sides, while the guiding portion 20 is pressed on account of its relatively slight wall thickness.

The cylindrical inner circumference 64 thrusts like a closing or valve element with form-fitting and sealing action against the outer circumference of the closing needle, so that no more material can get from the flow channel 12 into the expansion portions 34, 36, 38, 40 and 42 of the guide bushing 16 during the injection process. The sealing of the closing needle is thus considerably improved as compared to conventional designs, because at the time of high pressure load in the flow channel 12 no more material can get through the guide bushing 16 from the die to the outside. At the same time, the needle is fixed in its position concentrically to the longitudinal axis L. It can no longer be deflected from its central position by the flowing material, which has a favourable effect on the flow conditions in the flow channel 12.

Once the injection cycle is ended, the pressure in the flow channel 12 is once more dissipated. The guiding portion 20 thanks to its elasticity once more assumes its original shape and the inner circumference 64 of the guiding portion detaches from the outer circumference of the closing needle. This can be moved unhindered into the closing position.

It will be noted that the wall thickness W of the guiding portion 20, preferably made of a steel material, is chosen such that it is formable in the elasticity range of the material, and the slight movement play between the closing needle and the inner circumference 64 is overcome by the material pressure, so that during the high-pressure phase in the die the needle is not arrested in the middle and no material can get to the outside. Even so, the needle is precisely guided between the individual pressure cycles within the guiding portions 20, 22, 24, 26, 28 and 30.

The expansion portions 34, 36, 38, 40 and 42, as already described above, serve to hold liquid material, which should substantially allow a lubricating guidance of the valve needle. Thanks to the fact that a plurality of expansion portions 34, 36, 38, 40 and 42 is formed, a diminishing pressure gradient in FIG. 1 is generated in the guide bushing 16 from bottom to top, so that the liquid material is prevented from passing upward through the guide bushing 16 and emerging from the guide bushing 16. Since the expansion portions 34, 36, 38, 40 and 42 are formed in the guide bushing 16 and not in the valve needle, the plastic located therein does not participate in the up and down movement of the valve needle, so that little or no pumping action is generated. The additional sealing by the prestressed seal element 80 effectively prevents an emergence of liquid material from the top side of the guide bushing 16.

For the dismounting of the guide bushing 16 from the distributor plate 10, one may proceed as follows. First of all, the fastening element 52 is unscrewed from the recess 48. Next, the seal element 80 is removed, insofar as it was not secured in the fastening element 52 and unscrewed together with the fastening element 52 from the recess 48. After this, the main part 50 of the guide bushing 16 can be pulled out from the recess 48. Often, however, there is the problem that the main part 50 or its neck portion 60 gets stuck in the recess 48 in the course of operations. In order to still allow for a pulling out of the main part 50 from the recess 48, the guide bushing 16 has on its upper neck portion 50 an external thread 72. A removal element (not shown), such as a handle, can be screwed onto the external thread 72, which makes it easier to pull the main part 50 out from the recess 48.

The invention is not confined to one of the above described embodiments, but instead can be modified in diversified ways.

All features and benefits emerging from the claims, the specification, and the drawing, including design features, spatial arrangements, and method steps, can be significant to the invention both in themselves or in the most diverse of combinations.

Additional Description

With reference to the figures, further embodiments are discussed:

Embodiment 1 is a guide bushing 16 for the guiding and sealing of a closing needle of a needle valve nozzle of an injection moulding apparatus, wherein the guide bushing 16 has a main part 50 and a fastening element 52, wherein the main part 50 has a through-opening 18 for the closing needle, wherein the through-opening 18 comprises at least one guiding portion 20, 22, 24, 26, 28, 30, which encloses the closing needle with slight movement play, wherein the through-opening 18 comprises at least two expansion portions 34, 36, 38, 40, 42, whose diameter in each case is larger than that of the at least one guiding portion 20, 22, 24, 26, 28, 30, characterized in that the guide bushing 16 moreover comprises a fastening element 52, which is securable to the main part 50, wherein a seal element 80 is arranged between the fastening element 52 and the main part 50, bearing against the entire circumference of a closing needle inserted into the through-opening 18.

Embodiment 2 is a guide bushing 16 according to Embodiment 1, characterized in that the fastening element 52 is configured as a hollow cylinder for at least a portion and it has an external thread 54 on an outer envelope surface.

Embodiment 3 is a guide bushing 16 according to any one of Embodiments 1 to 2, characterized in that the fastening element 52 comprises an encircling flange rim 74, wherein the flange rim 74 is designed to apply a force to the seal element 80 in the direction of the main part 50 when securing the fastening element 52 to the main part 50.

Embodiment 4 is a guide bushing 16 according to any one of Embodiments 1 to 3, characterized in that the seal element 80 consists of an elastomer.

Embodiment 5 is a guide bushing 16 according to any one of Embodiments 1 to 4, characterized in that the seal element 80 is annular.

Embodiment 6 is a guide bushing 16 according to any one of Embodiments 1 to 5, characterized in that the main part 50 and/or the fastening element 52 are each designed as a single piece.

Embodiment 7 is a guide bushing 16 according to any one of Embodiments 1 to 6, characterized in that the main part 50 has an external thread 72.

Embodiment 8 is an injection moulding apparatus with a distributor plate 10, in which at least one flow channel 12 for a flowable material is formed, with at least one needle valve nozzle, through which the flowable material is able to be supplied as a continuation of the flow channel 12 to a removable mould insert, with at least one closing needle, which passes through the flow channel 12 in lengthwise displacement for at least a portion and which can be brought by a drive unit into an opening and a closing position, and with a guide bushing 16 according to any one of Embodiments 1 to 7.

Embodiment 9 is an injection moulding apparatus according to Embodiment 8, characterized in that one guiding portion 20 (e.g., one 20 of the at least one guiding portion 20, 22, 24, 26, 28, 30) of the guide bushing 16 lies at least for a portion in the flow channel 12.

Embodiment 10 is an injection moulding apparatus according to Embodiment 9, characterized in that the guiding portion 20 has or forms at least one contact surface 62 for the flowable material, lying at least for a portion in the flow channel 12.

Embodiment 11 is an injection moulding apparatus according to Embodiment 10, characterized in that the contact surface 62 is formed by the outer circumference of the guiding portion 20.

Embodiment 12 is an injection moulding apparatus according to any one of Embodiments 10 to 11, characterized in that the contact surface 62 is a slanting surface, preferably a conical surface.

Embodiment 13 is an injection moulding apparatus according to any one of Embodiments 8 to 12, characterized in that the guide bushing 16 is a separately exchangeable component.

Embodiment 14 is an injection moulding apparatus according to any one of Embodiments 8 to 13, characterized in that the guide bushing 16 is securable on and/or in the distributor plate 10.

Embodiment 15 is an injection moulding apparatus according to any one of Embodiments 8 to 14, characterized in that the guide bushing 16 sits in a recess 48 in the distributor plate 10 and/or in the needle valve nozzle.

LIST OF REFERENCE SYMBOLS

10 Distributor plate
12 Flow channels
14 Bottom side
16 Guide bushing
18 Through-borehole
20 Guiding portion
22 Guiding portion
24 Guiding portion
26 Guiding portion
28 Guiding portion
30 Guiding portion
34 Expansion portion
36 Expansion portion
38 Expansion portion
40 Expansion portion
42 Expansion portion
46 Flange
48 Recess
50 Main part
52 Fastening element
54 External thread
56 Internal thread
58 Bottom
60 Neck portion
62 Outer circumference
64 Inner circumference
66 Through-borehole
68 Inner wall
70 Neck portion
72 External thread
74 Flange rim
76 Opening
78 Top side
80 Seal element
L Longitudinal axis
U Wall thickness
W Wall thickness

What is claimed is:

1. Guide bushing for guiding and sealing of a closing needle of a needle valve nozzle of an injection moulding apparatus, the guide bushing having:
 a main part having a flange and a neck portion, the neck portion having a top side, and
 a fastening element coaxially enclosing the neck portion, the fastening element having an encircling flange rim at its top side, wherein the flange rim has a central opening which is oriented concentrically with a through-borehole of the main part,
 wherein the main part has a through-opening for the closing needle, wherein the through-opening of the main part comprises at least one guiding portion, which encloses the closing needle with slight movement play, wherein the through-opening comprises at least two expansion portions, whose diameter in each case is larger than that of the at least one guiding portion,
 wherein the diameter of the central opening in the flange rim corresponds to the diameter of the at least one guiding portion,
 wherein the fastening element is securable to the main part,
 wherein the guide bushing further comprises a seal element arranged between the fastening element and the main part, bearing against an entire circumference of the closing needle inserted into the through-opening, wherein the seal element is arranged between the flange rim of the fastening element and the top side of the main part, and wherein the flange rim of the fastening element is configured to apply a force to the seal element in the direction of the main part when securing the fastening element to the main part.

2. Guide bushing according to claim 1, wherein the fastening element is configured as a hollow cylinder for at least a portion and has an external thread on an outer envelope surface.

3. Guide bushing according to claim 1, wherein the seal element consists of an elastomer.

4. Guide bushing according to claim 1, wherein the seal element is annular.

5. Guide bushing according to claim 1, wherein the main part, the fastening element, or both the main part and the fastening element are each designed as a single piece.

6. Guide bushing according to claim 1, wherein the main part has an external thread.

7. Injection moulding apparatus with a distributor plate, in which at least one flow channel for a flowable material is formed, with at least one needle valve nozzle, through which the flowable material is able to be supplied as a continuation of the flow channel to a removable mould insert, with at least one closing needle, which passes through the flow channel in lengthwise displacement for at least a portion and which can be brought by a drive unit into an opening position and a closing position, and with the guide bushing according to claim 1.

8. Injection moulding apparatus according to claim 7, wherein one guiding portion of the guide bushing lies at least for a portion in the flow channel.

9. Injection moulding apparatus according to claim 8, wherein the one guiding portion has or forms at least one contact surface for the flowable material, lying at least for a portion in the flow channel.

10. Injection moulding apparatus according to claim 9, wherein the at least one contact surface is formed by an outer circumference of the one guiding portion.

11. Injection moulding apparatus according to claim 9, wherein the at least one contact surface is a slanting surface.

12. Injection moulding apparatus according to claim 7, wherein the guide bushing is a separately exchangeable component.

13. Injection moulding apparatus according to claim 7, wherein the guide bushing is securable on or in the distributor plate.

14. Injection moulding apparatus according to claim 7, wherein the guide bushing sits in a recess in the distributor plate, in the needle valve nozzle, or in the distributor plate and in the needle valve nozzle.

* * * * *